(12) United States Patent
Lee et al.

(10) Patent No.: US 8,908,124 B2
(45) Date of Patent: Dec. 9, 2014

(54) LIGHT GUIDE PLATE AND LIQUID CRYSTAL DISPLAY DEVICE INCLUDING THE SAME

(75) Inventors: Sang-Hyun Lee, Gyeongsangbuk-do (KR); Byoung-Ku Kim, Gyeongsangbuk-do (KR); Won Taek Moon, Gyeongsangbuk-do (KR); Young-Ik Hwang, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 141 days.

(21) Appl. No.: 12/845,273

(22) Filed: Jul. 28, 2010

(65) Prior Publication Data

US 2011/0025950 A1 Feb. 3, 2011

(30) Foreign Application Priority Data

Jul. 30, 2009 (KR) ........................ 10-2009-0070154

(51) Int. Cl.
*G02F 1/1335* (2006.01)
*F21V 8/00* (2006.01)

(52) U.S. Cl.
CPC ............ *G02B 6/0036* (2013.01); *G02B 6/0061* (2013.01); *G02B 6/0068* (2013.01)
USPC .............................................. 349/65; 349/63

(58) Field of Classification Search
USPC ........................ 349/61–66; 362/600, 615, 619
See application file for complete search history.

(56) References Cited

U.S. PATENT DOCUMENTS

| | | | | |
|---|---|---|---|---|
| 6,454,452 B1* | 9/2002 | Sasagawa et al. | ............ | 362/561 |
| 7,375,775 B2* | 5/2008 | Kim | ............................... | 349/58 |
| 7,478,942 B2* | 1/2009 | Kim et al. | ..................... | 362/620 |
| 7,510,315 B2* | 3/2009 | Hsu | ............................... | 362/615 |
| 2002/0197051 A1* | 12/2002 | Tamura et al. | ................. | 385/146 |
| 2004/0104793 A1* | 6/2004 | Tamura et al. | ................. | 333/239 |
| 2005/0248961 A1* | 11/2005 | Kazuhiro et al. | ............. | 362/633 |
| 2006/0209563 A1* | 9/2006 | Hirota et al. | .................. | 362/608 |
| 2008/0129925 A1* | 6/2008 | Han et al. | ......................... | 349/65 |
| 2009/0109373 A1* | 4/2009 | Taniguchi et al. | ............. | 349/65 |
| 2009/0279324 A1* | 11/2009 | Chen et al. | ..................... | 362/616 |
| 2010/0060817 A1* | 3/2010 | Park et al. | ......................... | 349/64 |
| 2010/0182542 A1* | 7/2010 | Nakamoto et al. | ............. | 349/65 |

FOREIGN PATENT DOCUMENTS

| | | | | | |
|---|---|---|---|---|---|
| CN | 1508571 A | * | 6/2004 | ............... | G02B 5/02 |
| CN | 101349834 A | | 1/2009 | | |
| KR | 10-2002-089188 | | 11/2002 | | |
| KR | 10-2008-0006312 | * | 1/2008 | | |
| KR | 1020080006312 | | 1/2008 | | |
| TW | 463957 U | * | 11/2001 | ............... | G02B 6/00 |

* cited by examiner

*Primary Examiner* — Lauren Nguyen
*Assistant Examiner* — Anthony G Quash
(74) *Attorney, Agent, or Firm* — McKenna Long & Aldridge LLP

(57) ABSTRACT

A light guide plate for a backlight unit of a liquid crystal display device includes one side surface where light from a first light source is incident; the other side surface opposite to the one side surface; a front surface combining the one and the other one side surfaces; and a rear surface including a plurality of light guide patterns, each of the plurality of light guide patterns including a protruding portion and a groove portion, wherein one of the protruding portion and the groove portion is positioned at a center of the other one of the protruding portion and the groove portion.

17 Claims, 7 Drawing Sheets

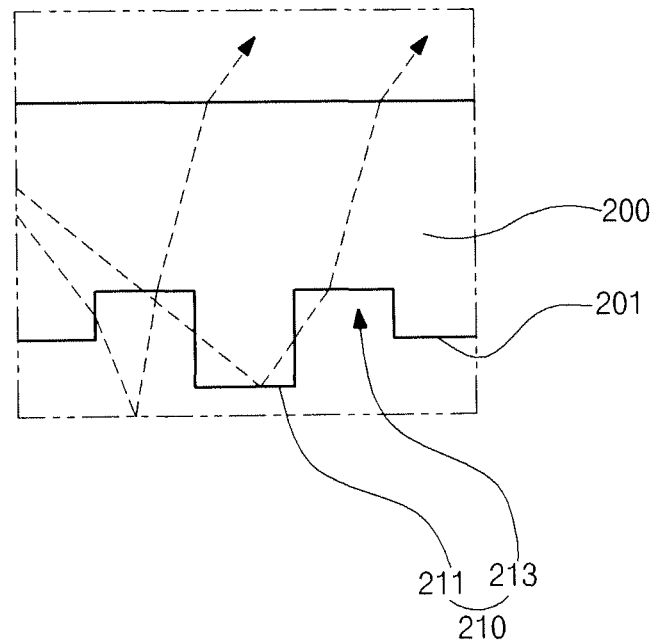
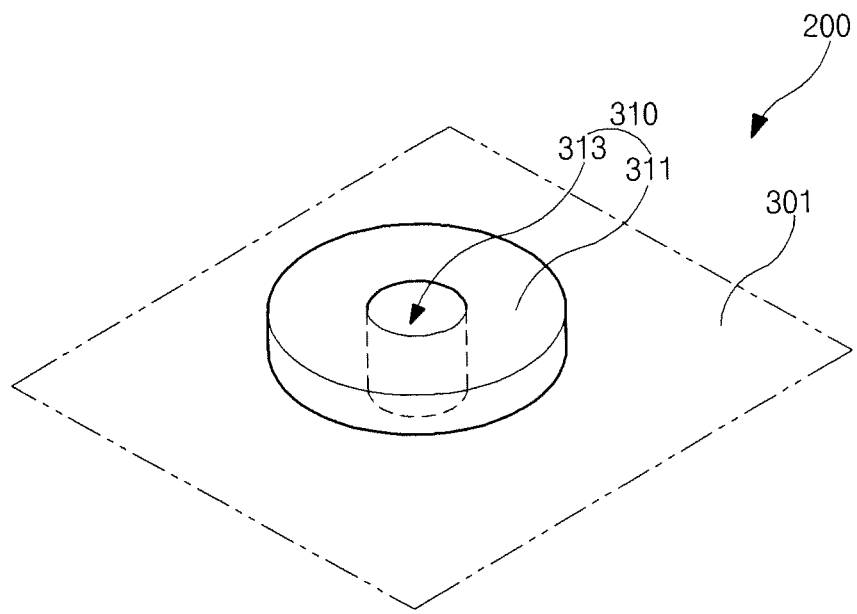

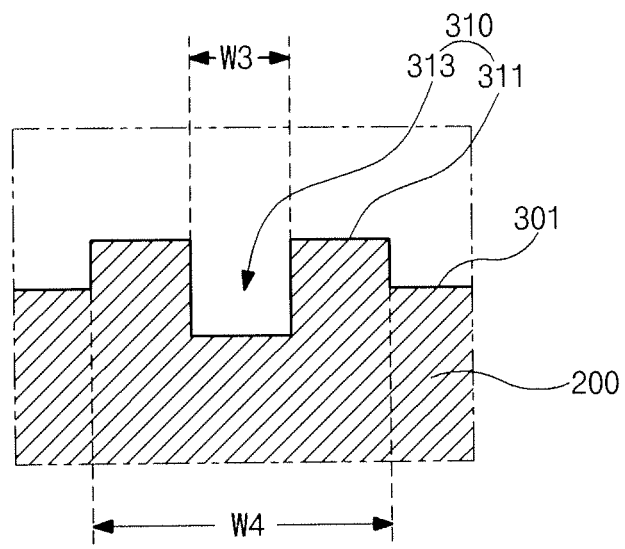
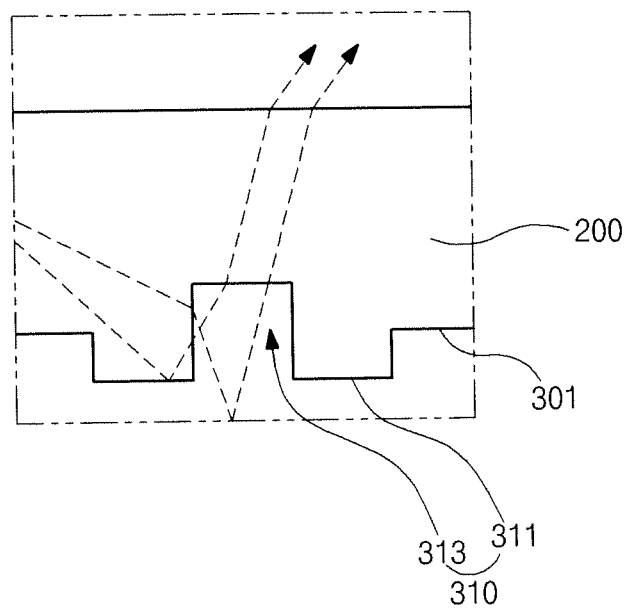

LIGHT GUIDE PLATE AND LIQUID CRYSTAL DISPLAY DEVICE INCLUDING THE SAME

The present invention claims the benefit of Korean Patent Application No. 10-2009-0070154 filed in Korea on Jul. 30, 2009, which is hereby incorporated by reference.

BACKGROUND OF THE INVENTION

1. Field of the Invention

The invention relates to a light guide plate and a liquid crystal display (LCD) device, and more particularly, to a light guide plate being capable of preventing a difference in light brightness and an LCD device including the light guide plate.

2. Discussion of the Related Art

The liquid crystal display (LCD) devices are widely used for notebook computers, monitors, TV, and so on, because of their high contrast ratio and characteristics adequate to display moving images. The LCD devices use optical anisotropy and polarization properties of liquid crystal molecules to display images.

The LCD devices require a liquid crystal panel including first and second substrates and a liquid crystal layer interposed therebetween. An arrangement of the liquid crystal molecules in the liquid crystal layer is changed by an electric field induced in the liquid crystal panel to control light transmissivity.

Generally, an additional light source is required because the LCD panel is a non-emissive-type display device. Accordingly, a backlight unit is disposed under the LCD panel. The LCD device displays images using light produced by the backlight unit and supplied to the LCD panel. A cold cathode fluorescent lamp (CCFL), an external electrode fluorescent lamp and a light emitting diode (LED) are used as a light source of the backlight unit. Among these light sources, the LEDs are widely used because of advantages in a size, power consumption and reliability.

FIG. 1 a cross-sectional view of the related art LCD device using an LED as a light source. Referring to FIG. 1, the LCD device includes a liquid crystal panel 10, a backlight unit 20, a main frame 30, a bottom frame 50 and a top frame 40. The liquid crystal panel 10 includes first and second substrates 12 and 14 facing each other and a liquid crystal layer (not shown) therebetween. First and second polarizing plates 19a and 19b for controlling a polarization direction of light, are respectively disposed at front and rear sides of the liquid crystal panel 10.

The backlight unit 20 is disposed at a rear side of the liquid crystal panel 10. The backlight unit 20 includes an LED assembly 29 arranged along a length direction of at least one edges of the main frame 30, a reflective sheet 25 of white or silver color on the bottom frame 50, a light guide plate 23 on the reflective sheet 25 and an optical sheet 21 on the light guide plate 23. The LED assembly 29 is positioned at one side of the light guide plate 23 and includes at least one LED 29a emitting white light and an LED printed circuit board (PCB) 29b where the LED 29a is disposed. The optical sheet 21 includes a plurality of sheets.

The liquid crystal display panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modulation.

FIG. 2 is an enlarged cross-sectional view of an "A" portion in FIG. 1. Referring to FIG. 2 with FIG. 1, the LED 29a is positioned at one side of the light guide plate 23 and arranged on the PCB 29b. The LED 29a has a fixed position and faces a side portion of the light guide plate 23 such that light emitted from the LED 29a is projected to the light guide plate 23. To provide a space for the LED assembly 29, the bottom frame 50 has a bending portion. Namely, the bottom frame 50 is bent upwardly. The LED assembly 29 is fixed in the bending portion of the bottom frame 50 using an element, for example, a double coated tape.

The light emitted from the LED 29a is projected to the light guide plate 23 and refracted or reflected to be projected onto the liquid crystal panel 10. The light is processed into an uniform plane light source during passing the optical sheet 21.

On the other hand, the LCD device is required to be thinner and lighter. In addition, an increase of brightness is required. Unfortunately, there is a limitation for thinner and lighter LCD device. Particularly, since the backlight unit 20 requires more elements for brightness, a thickness or a weight of the LCD device depends on those of the backlight unit 20.

SUMMARY OF THE INVENTION

Accordingly, embodiments of the invention are directed to a light guide plate and an LCD device including the same that substantially obviate one or more of the problems due to limitations and disadvantages of the related art.

An object of the invention is to provide an LCD device producing high brightness images.

Another object of the invention is to provide a light guide plate providing an uniform brightness and an LCD device including the light guide plate.

Another object of the invention is to increase production yield in LCD device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a light guide plate for a backlight unit of a liquid crystal display device includes one side surface where light from a first light source is incident; the other side surface opposite to the one side surface; a front surface combining the one and the other one side surfaces; and a rear surface including a plurality of light guide patterns, each of the plurality of light guide patterns including a protruding portion and a groove portion, wherein one of the protruding portion and the groove portion is positioned at a center of the other one of the protruding portion and the groove portion.

In another aspect, a backlight unit for a liquid crystal display device includes a reflective sheet; a light guide plate on the reflective sheet and including a plurality of light guide patterns on a rear surface of the light guide plate, each of the plurality of light guide patterns including a protruding portion and a groove portion; a first light source at one side of the light guide plate; and an optical sheet on the light guide plate, wherein one of the protruding portion and the groove portion is positioned at a center of the other one of the protruding portion and the groove portion.

In another aspect, a liquid crystal display device includes a liquid crystal panel; a backlight unit for projecting light on the liquid crystal panel, the backlight unit including: a reflective sheet; a light guide plate on the reflective sheet and including a plurality of light guide patterns on a rear surface of the light guide plate, each of the plurality of light guide patterns including a protruding portion and a groove portion; a first light source at one side of the light guide plate; and an optical sheet on the light guide plate, wherein one of the protruding portion and the groove portion is positioned at a center of the other one of the protruding portion and the groove portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings:

FIGS. 5A to 5C are views for illustrating a light guide plate according to an exemplary embodiment of the present invention;

FIGS. 6A to 6C are views for illustrating a light guide plate according to another exemplary embodiment of the present invention.

DETAILED DESCRIPTION OF EXEMPLARY EMBODIMENTS

Reference will now be made in detail to exemplary embodiments of the invention, which are illustrated in the accompanying drawings.

Figure 1:
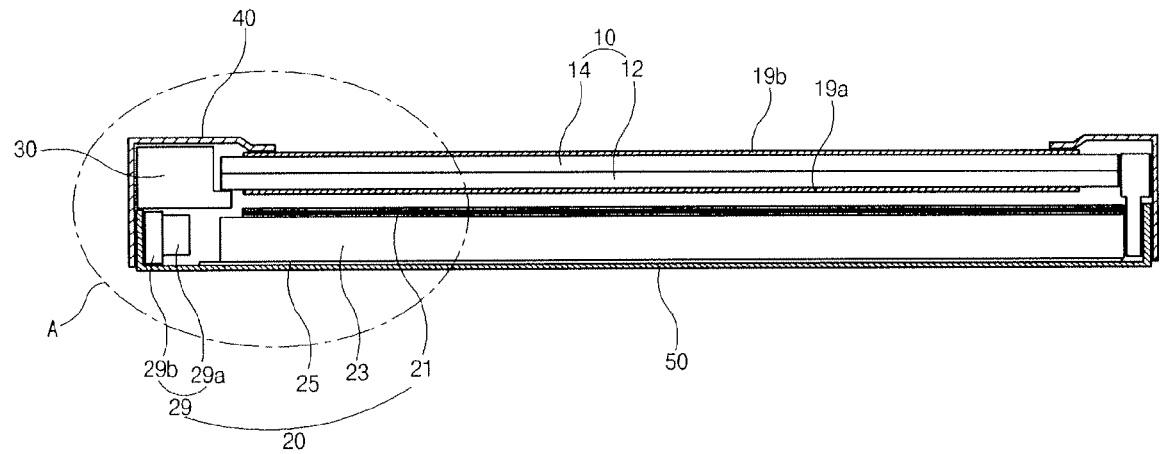
FIG. 1 a cross-sectional view of the related art LCD device using an LED as a light source.
Figure 2:
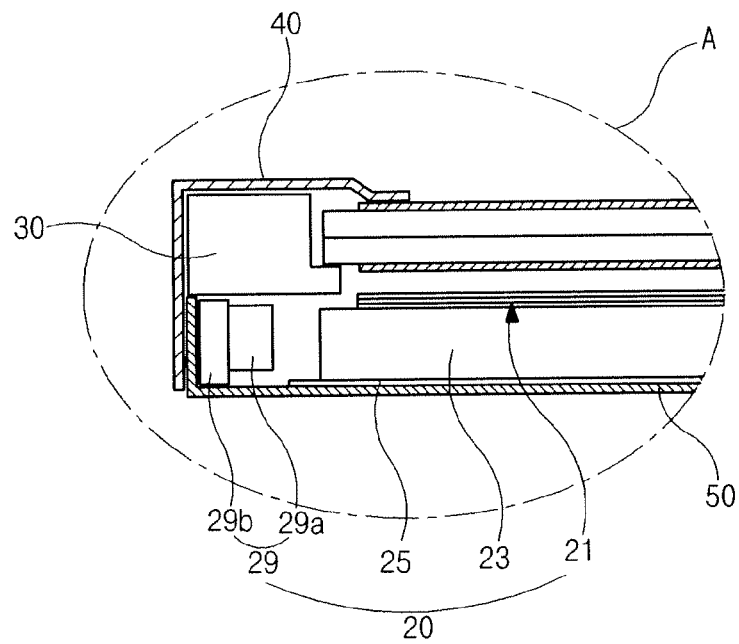
FIG. 2 is an enlarged cross-sectional view of an "A" portion in FIG. 1.
Figure 3:
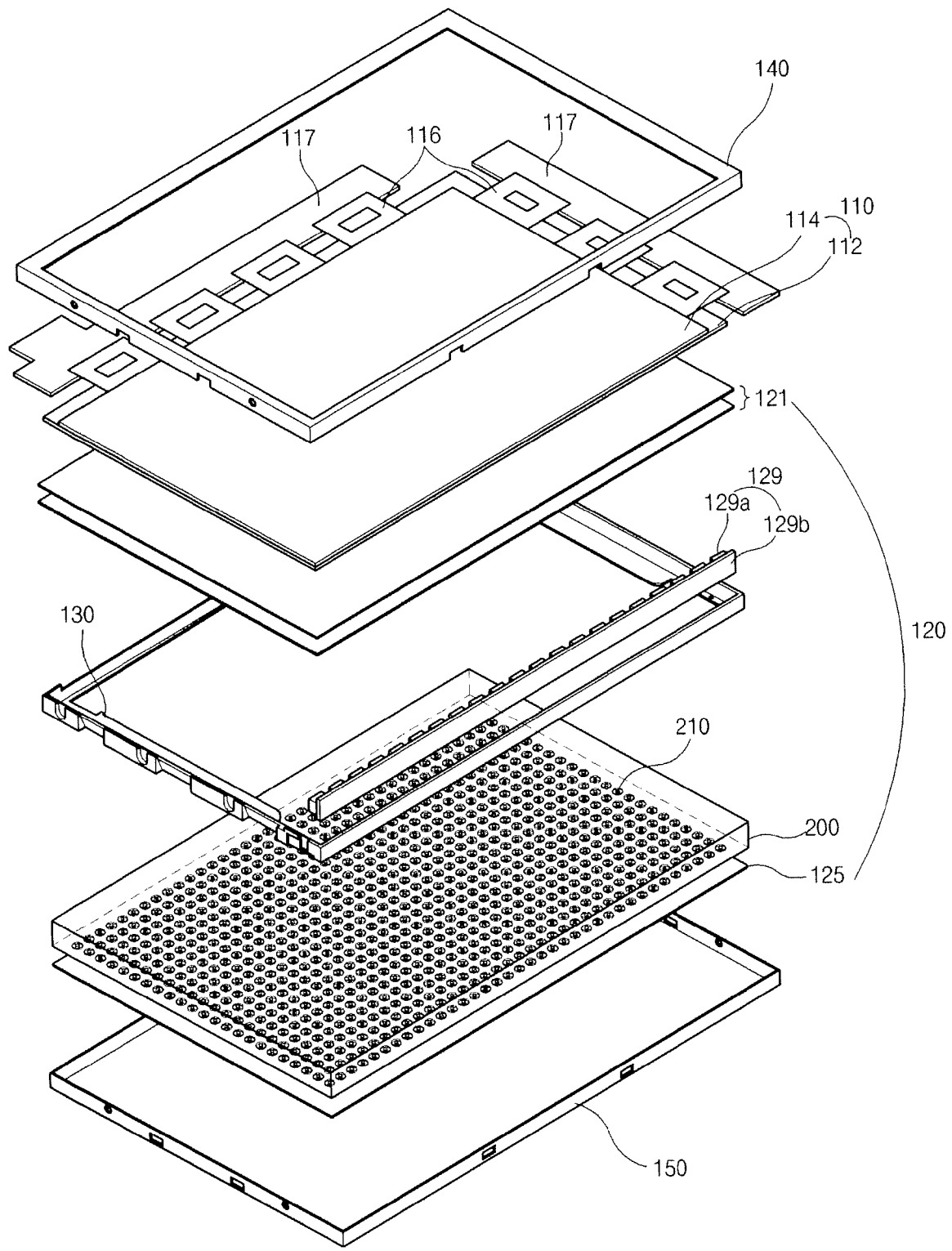
FIG. 3 is an explode perspective view of an LCD device according to the present invention.

FIG. 3 is an explode perspective view of an LCD device according to the present invention. Referring to FIG. 3, an LCD device includes a liquid crystal panel 110, a backlight unit 120, a main frame 130, a bottom frame 150 and a top frame 140.

The liquid crystal panel 110 includes first and second substrates 112 and 114 facing each other and a liquid crystal layer (not shown) therebetween. In an active matrix type, array elements, for example, a gate line (not shown), a data line (not shown), a thin film transistor (not shown) and a pixel electrode, are formed on the first substrate 112. The gate and data lines cross each other to define a pixel region, and the thin film transistor is formed at a crossing portion of the gate and data lines. The pixel electrode is disposed in the pixel region and connected to the thin film transistor. In addition, a black matrix (not shown) corresponding to the gate line, the data line and the thin film transistor to block light and a color filter layer (not shown) having red, green and blue colors are formed on the second substrate 114. A common electrode (not shown) is also formed on the second substrate 114 to generate an electric field with the pixel electrode on the first substrate 112. Moreover, first and second polarizing plates for selectively transmitting light are positioned on outer sides of the first and second substrates 112 and 114.

The liquid crystal panel 110 is connected to a driving printed circuit board (PCB) 117 through a connection member 116, for example, a flexible circuit board or a tape carrier package, that provide a scanning signal and an image signal to the liquid crystal panel 110, respectively. The driving printed circuit board 117 extends along end portions of a bottom frame 150 of the backlight unit 120, respectively, as dummy spaces.

When the thin film transistor has an ON state by the scanning signal from a gate driving circuit, the image signal is applied to the pixel electrode through the data line to produce an electric field between the pixel electrode and the common electrode. As a result, as the intensity or direction of the electric field is changed, the alignment of the liquid crystal molecules in the liquid crystal layer also changes such that light transmissivity is controlled.

To display images using the controlled transmissivity, the backlight unit 120 projecting light to the liquid crystal panel 110 is disposed at a rear side of the liquid crystal panel 110. The backlight unit 120 is classified into an edge type and a direct type depending on a position of the light source. In the edge type backlight unit, at least one light source is arranged at one side or two opposite sides of a light guide plate. In the direct type backlight unit, a plurality of light sources are arranged under an optical sheet. Recently, to meet a requirement for a thinner profile, the edge type backlight unit is widely used.

The backlight unit 120 includes an LED assembly 129 as a light source, a reflective sheet 125 of white or silver color, a light guide plate 200 on the reflective sheet 125 and an optical sheet 121 on the light guide plate 200. A cold cathode fluorescent lamp (CCFL), an external electrode fluorescent lamp and a light emitting diode (LED) are used as a light source of the backlight unit. Among these light sources, the LEDs are widely used because of advantages in a size, power consumption and reliability.

The LED assembly 129 is positioned at a side of the light guide plate 200 to provide light into the light guide plate 200. The LED assembly 129 includes a plurality of LEDs 129a and a PCB 129b where the LEDs 129a. The LEDs 129a are arranged on the PCB 129a and spaced apart from each other. One LED 129a emits red color light, another LED 129a emits green color light, and the other LED 129a emits blue color light. By turning on and off the LEDs 129a, white light is provided by a color mixture of the LEDs 129a.

Alternatively, an LED chip emits all of red, blue and green color lights may be used. Or, an LED chip for emitting white color light may be further arranged. In addition, an LED cluster including a plurality of LEDs may be used. Moreover, the LEDs 129a may be arranged on the PCB 129b in at least two rows. Furthermore, the LED assembly 129 may be disposed at two opposite sides of the light guide plate 200.

The light emitted from the LED 129a travels the light guide plate 200 with a total reflection such that a plane light source is provided onto the liquid crystal panel 110. The light guide plate 200 according to the present invention includes a light guide pattern 210 on a rear surface of the light guide plate 200 to provide more uniform plane light. In addition, an emitted angle of the light through the light guide plate 200 is controlled by the light guide pattern 210 such that a number of the optical sheet 121 can be reduced. The detailed explanation will be below.

The reflective sheet 121 is disposed under the light guide plate 200 to reflect the light through the light guide plate 200 toward the liquid crystal panel 100 to increase brightness. The optical sheet 121 on the light guide plate 200 includes at least one light concentration sheet. The light through the light guide plate 200 is diffused and concentrated by the optical sheet 121 to provide more uniform plate light onto the liquid crystal panel 110.

The liquid crystal display panel 110 and the backlight unit 120 are combined using the main frame 130 that can prevent movement of the liquid crystal panel 110 and the backlight unit 120. The top frame 140 cover edges of the liquid crystal panel 110 and sides of the main frame 130 and the light crystal panel 110, so the top frame 140 can support and protect of the edges of the liquid crystal panel 110 and sides of the main frame 130 and the light crystal panel 110. The bottom frame 150 covers back edges of the main frame 130, so the bottom frame 150 is combined with the main frame 130 and the top frame 140 for modulation. Four sides of the bottom frame 150 are upwardly bent.

Figure 4:
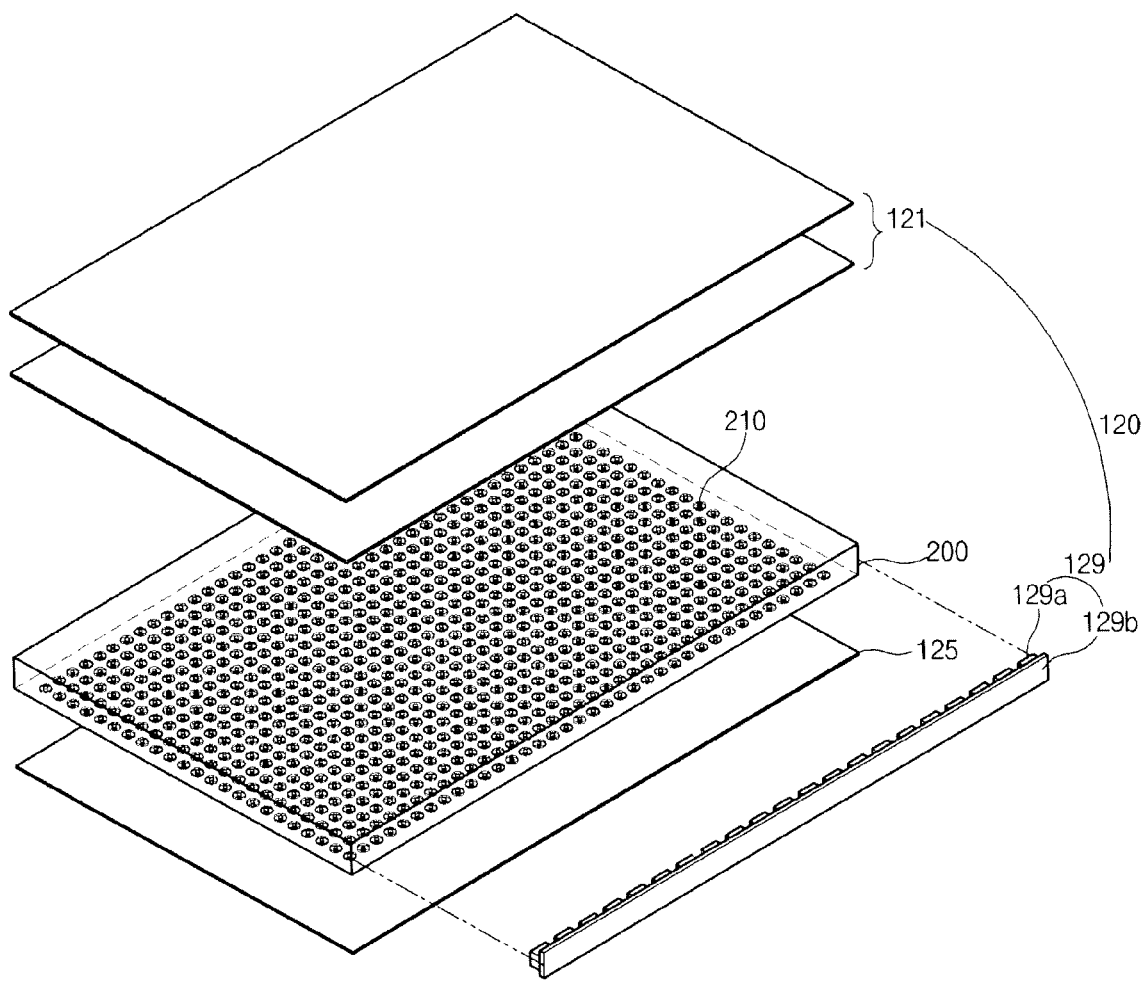
FIG. 4 is an explode perspective view of a backlight unit for an LCD device according to the present invention.

FIG. 4 is an explode perspective view of a backlight unit for an LCD device according to the present invention. Referring to FIG. 4, the backlight unit 120 includes the reflective sheet 125 disposed on the bottom frame 150 (of FIG. 3), the light guide plate 200 on the reflective sheet 125, the LED assembly 129 as a light source at a side of the light guide plate 200 and an optical sheet 121 on the light guide plate 200.

The light guide plate 200 is disposed at the same plane as the LED assembly 129. The light guide plate 200 is formed of a transparent material. For example, the light guide plate 200 is formed of an acryl-based transparent resin such as polymethylmethacrylate (PMMA) or a polycarbonate-based transparent material. PMMA has advantages in a transparent property, a weathering property, a coloring property, and so on.

The light guide pattern 210 is disposed at a rear surface of the light guide plate 200 to control light path. The light from the LED 129a travels through the light guide plate 200. In this case, the light is refracted by the light guide pattern 210 of the light guide plate 200 to reach at the liquid crystal panel 110 (of FIG. 3). By controlling a density of the light guide pattern 210, the light can be uniformly emitted from the light guide plate 200 through an entire surface.

In addition, the reflective sheet 125 and the light guide plate 200 may be partially adhered to each other without the light guide pattern 210. In this case, a brightness difference between an adhered portion and a non-adhered portion may be generated such that a stain may be generated on the displaying image. However, the above problem is prevented due to the light guide pattern 200. Furthermore, since the light path is controlled by the light guide pattern 210, the light is vertically provided onto the liquid crystal panel 110. Accordingly, light brightness can be improved, and a number of the optical sheet 121 (of FIG. 3) can be reduced.

Figure 5A:
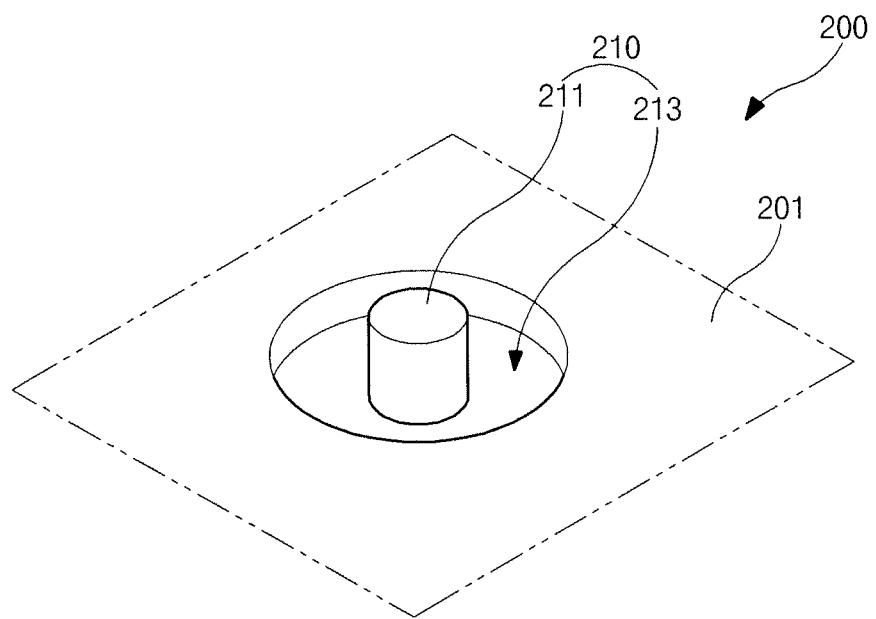
Figure 5B:
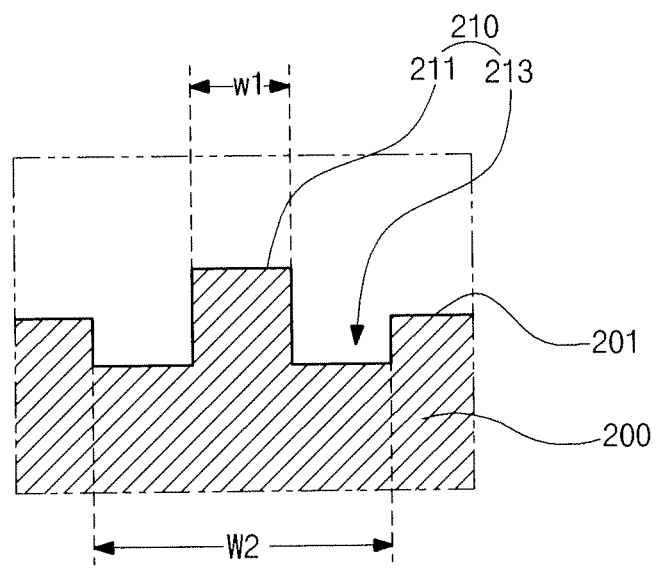

FIGS. 5A to 5C are views for illustrating a light guide plate according to an exemplary embodiment of the present invention, and FIGS. 6A to 6C are views for illustrating a light guide plate according to another exemplary embodiment of the present invention.

Referring to FIG. 5A to 5C, a light guide pattern 210 is disposed on a rear surface 201 of the light guide plate 200. The light is refracted by the light guide pattern 210 to be vertical provided to the liquid crystal panel 110. The light form the LED 129a as a light source is incident to one side surface of the light guide plate 200. The rear surface 201 of the light guide plate 200 faces the reflective sheet 125 (of FIG. 4). The light guide pattern 210 includes a protruding portion 211 and a groove portion 213. The protruding portion 211 protrudes from the rear surface 201 of the light guide plate 200. For example, the protruding portion 211 has a cross-sectional view of a circular shape, an elliptical shape or a polygonal shape. The groove portion 213 surrounds the protruding portion 211 and is concaved from the rear surface 201 of the light guide plate 200. Namely, in a cross-sectional view, two groove portions 213 are disposed at both sides of the protruding portion 211. The groove portion 213 has a donut shape. In other words, the groove portion 213 has a circular shape, and the protruding portion 211 protrudes from a center of the groove portion 213. With respect to a front surface, which is opposite to the rear surface 201 of the light guide plate 200, of the light guide plate 200, the rear surface 201 has a height smaller than that of the protruding portion 211 and greater than that of the groove portion 213. In other words, with respect to the reflective sheet 125, the rear surface 201 has a height smaller than that of the groove portion 213 and greater than that of the protruding portion 211.

Referring to FIGS. 6A to 6C, a light guide pattern 310 is disposed on a rear surface 301 of the light guide plate 200. The light is refracted by the light guide pattern 310 to be vertical provided to the liquid crystal panel 110. The rear surface 301 of the light guide plate 200 faces the reflective sheet 125 (of FIG. 4). The light guide pattern 310 includes a protruding portion 311 and a groove portion 313. The protruding portion 311 protrudes from the rear surface 301 of the light guide plate 200. The protruding portion 311 has a donut shape. The groove portion 313 is surrounded by the protruding portion 311. Namely, in a cross-sectional view, two protruding portions 311 are disposed at both sides of the groove portion 313. For example, the groove portion 313 has a cross-sectional view of a circular shape, an elliptical shape or a polygonal shape. The groove portion 313 is concaved from the rear surface 301 of the light guide plate 200. In other words, the protruding portion 311 has a circular shape, and the groove portion 313 is concaved from a center of the protruding portion 313. With respect to a front surface, which is opposite to the rear surface 301 of the light guide plate 200, of the light guide plate 200, the rear surface 301 has a height smaller than that of the protruding portion 311 and greater than that of the groove portion 313. In other words, with respect to the reflective sheet 125, the rear surface 301 has a height smaller than that of the groove portion 313 and greater than that of the protruding portion 311.

Generally, the optical sheet includes a diffusion sheet and a light concentration sheet to provide high brightness light. The diffusion sheet is disposed between the light guide plate and the light concentration sheet. The light is dispersed by the diffusion sheet and is provided to the light concentration sheet. Generally, the light from the light guide plate has an angle of about 70 to 80 degrees with respect to the liquid crystal panel, and the light from the diffusion sheet has an angle of about 50 to 60 degrees with respect to the liquid crystal panel. The light through the diffusion sheet is concentrated along the liquid crystal panel by the light concentration sheet. The light from the light concentrated sheet is substantially vertical to the liquid crystal panel.

In the present invention, since the light from the light guide plate 200 is substantially vertical to the liquid crystal panel 110 due to the light guide pattern 210 or 310, the diffusion sheet is not required. Accordingly, a thickness and a weight of the liquid crystal display device and the backlight unit 120 can be reduced. In addition, since the diffusion sheet is not required, there are advantages in production time and production yield. Furthermore, since an adhering problem of the light guide plate 200 with the reflective sheet 125 is prevented, there is no brightness difference problem.

When the protruding portion 211 is disposed at a center of the groove portion 213, as shown in FIGS. 5A to 5C, a first width W1 of the protruding portion 211 is one-third or half of a second width W2 of the groove portion 213. In addition, when the groove portion 313 is disposed at a center of the protruding portion 311, as shown in FIGS. 6A to 6C, a third width W3 of the groove portion 313 is one-third or half of a fourth width W4 of the protruding portion 311.

Figure 7A:
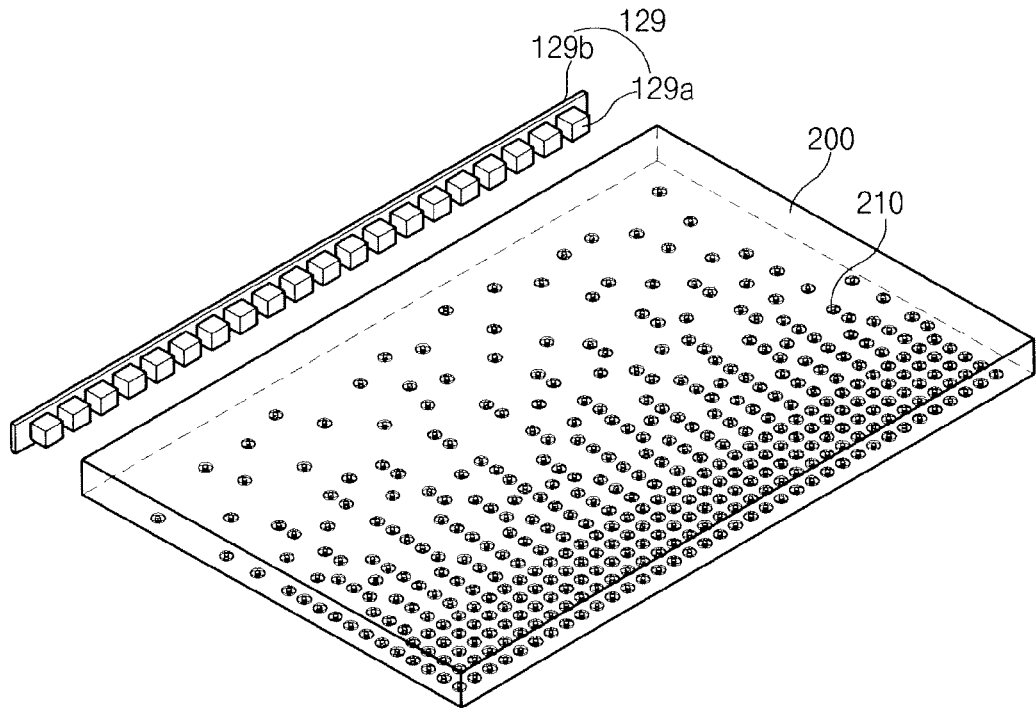
FIGS. 7A and 7B are perspective views for showing a density of patterns on a light guide plate according to the present invention, respectively.

As a size of the light guide pattern 210 or 310 is smaller and a density of the light guide patterns 210 and 310 are higher, an amount of the light provided onto the liquid crystal panel is increased. Accordingly, as a region is closer to the LED assembly 129, a density of the light guide patterns 210 or 310 is lower. Namely, as shown in FIG. 7A, the light guide pattern 210 has a density at one side of the light guide plate 200 smaller than at the other side of the light guide plate 200. The LED assembly 129 is disposed at the one side of the light guide plate 200. In other word, a number of the light guide patterns 210 in a unit area at the one side of the light guide plate 200 is smaller than a number of the light guide patterns 210 in a unit area at the other side of the light guide plate 200.

Figure 7B:
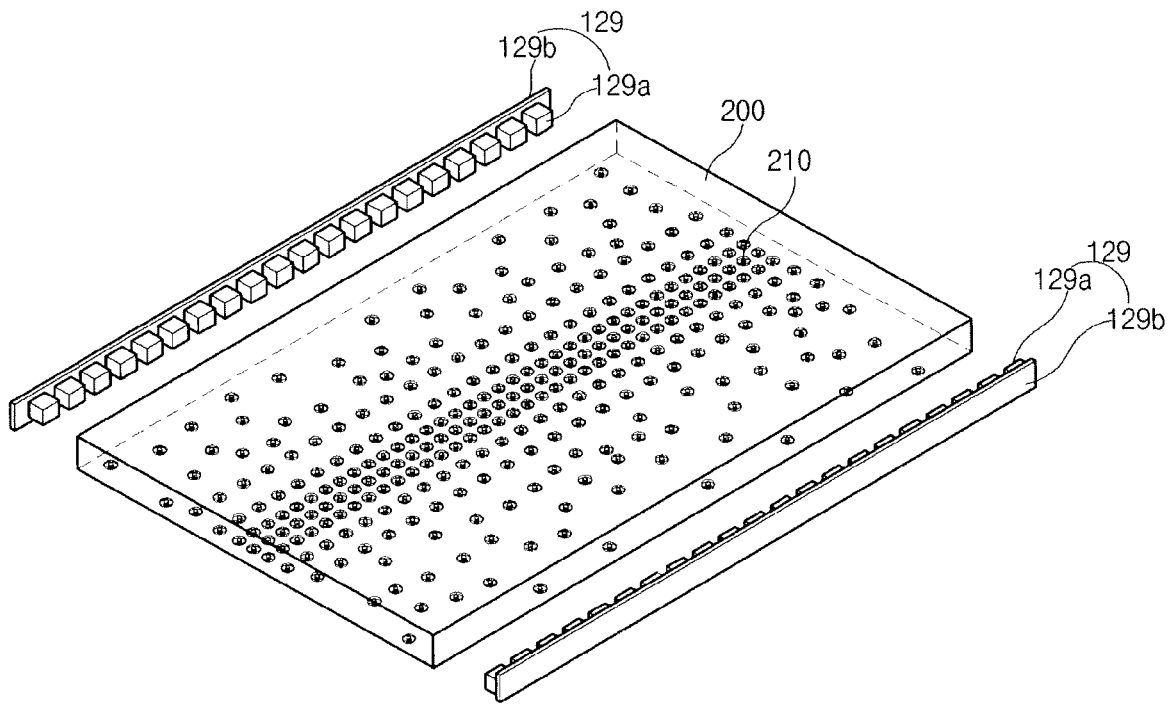

When the LED assemblies 129 are disposed at the one and the other one sides of the light guide plate 200 such that the light from the LED assemblies 129 is respectively incident on the one and the other one sides of the light guide plate 200, as shown in FIG. 7B, the light guide pattern 210 has a density at a center of the light guide plate 200 greater than those at the one and the other one sides of the light guide plate 200.

Simulation results of brightness in the related art LCD device and the LCD device according to the present invention are shown in Table 1.

TABLE 1

|  |  | Sample 1 | Sample 2 |
| --- | --- | --- | --- |
| Five-points brightness |  | 327.7 nit | 335 nit |
| Color index | Wx | 0.3135 | 0.3136 |
|  | Wy | 0.3370 | 0.3373 |

In the related art LCD device (Sample 1), a light guide pattern of the light guide plate only includes a protruding portion, and an optical sheet includes not only a light concentration sheet but also a diffusion sheet. In the LCD device according to the present invention (Sample 2), the light guide pattern of the light guide plate includes not only the protruding portion but also the groove portion, and the optical sheet only includes a light concentration sheet. The five-points brightness is an average value of brightness in fourth corners and a center point.

In Table 1, with the same color index, brightness of Sample 1 is greater than that of Sample 2 by about 2.4%. Namely, the backlight unit provides improved light brightness without the diffusion sheet.

In the present invention, since high brightness light is provided from the backlight unit without a diffusion sheet with the light guide plate having the guide pattern of the protruding portion and the groove portion, the LCD device has reduced thickness and weight. In addition, production costs for the LCD device are also reduced, and production yield is improved. Furthermore, a stain problem generated in the related art LCD device is prevented due to the light guide plate having the guide pattern of the protruding portion and the groove portion.

It will be apparent to those skilled in the art that various modifications and variations can be made in the exemplary embodiments of the present invention without departing from the spirit or scope of the invention. Thus, it is intended that the invention cover the modifications and variations of this invention provided they come within the scope of the appended claims and their equivalents.

What is claimed is:

1. A light guide plate for a backlight unit of a liquid crystal display device, comprising:
    one side surface where light from a first light source is incident;
    the other side surface opposite to the one side surface;
    a front surface combining the one and the other side surfaces;
    a rear surface including a plurality of light guide patterns, each of the plurality of light guide patterns including a protruding portion and a groove portion; and
    flat portions located between adjacent ones of the plurality of light guide patterns,
    wherein one of the protruding portion and the groove portion is positioned at a center of the other one of the protruding portion and the groove portion, and the protruding portion protrudes outwardly from the rear surface,
    wherein, with respect to the front surface, the rear surface of the flat portion has a height smaller than that of the protruding portion and greater than that of the groove portion,
    wherein a surface of the groove portion is entirely flat and parallel with the rear surface of the flat portion,
    wherein a surface of the protruding portion is entirely flat and parallel with the rear surface of the flat portion, and
    wherein the one of the protruding portion and the groove portion has a width being one-third or half of a width of the other one of the protruding portion and the groove portion and wherein each protruding portion is surrounded by its own individual groove portion and the same groove portion does not surround another protruding portion.

2. The light guide plate according to claim 1, wherein the one of the protruding portion and the groove portion has a cross-sectional view of a circular shape, an elliptical shape or a polygonal shape.

3. The light guide plate according to claim 1, wherein a density of the light guide patterns adjacent to the one side surface of the light guide plate is smaller than a density of the light guide patterns adjacent to the other side surface of the light guide plate.

4. The light guide plate according to claim 1, wherein light from a second light source is incident onto the other side surface, wherein a density of the light guide patterns adjacent to each of the one and the other side surfaces is smaller than a density of the light guide patterns at a center of the one and the other side surfaces.

5. A backlight unit for a liquid crystal display device, comprising:
    a reflective sheet;
    a light guide plate on the reflective sheet and including a plurality of light guide patterns on a rear surface of the light guide plate and flat portions located between adjacent ones of the plurality of light guide patterns, each of the plurality of light guide patterns including a protruding portion and a groove portion;
    a first light source at one side of the light guide plate; and
    an optical sheet on the light guide plate, wherein one of the protruding portion and the groove portion is positioned at a center of the other one of the protruding portion and the groove portion, and the protruding portion protrudes outwardly from the rear surface, wherein, with respect to a front surface of the light guide plate opposite to the rear surface, the rear surface of the flat portion has a height smaller than that of the protruding portion and greater than that of the groove portion, wherein a surface of the groove portion is entirely flat and parallel with the rear surface of the flat portion, and wherein a surface of the protruding portion is entirely flat and parallel with the rear surface of the flat portion and wherein each protruding portion is surrounded by its own individual groove portion and the same groove portion does not surround another protruding portion.

6. The backlight unit according to claim 5, wherein the one of the protruding portion and the groove portion has a cross-sectional view of a circular shape, an elliptical shape or a polygonal shape.

7. The backlight unit according to claim 5, wherein the one of the protruding portion and the groove portion has a width being one-third or half of a width of the other one of the protruding portion and the groove portion.

8. The backlight unit according to claim 5, wherein a density of the light guide patterns at the one side of the light guide plate is smaller than a density of the light guide patterns at the other side of the light guide plate.

9. The backlight unit according to claim 5, further comprising a second light source at the other side of the light guide plate.

10. The backlight unit according to claim 9, wherein a density of the light guide patterns at each of the one side and the other side of the light guide plate is smaller than a density of the light guide patterns at a center of the light guide plate.

11. A liquid crystal display device, comprising:
a liquid crystal panel;
a backlight unit for projecting light on the liquid crystal panel, the backlight unit including:
a reflective sheet;
a light guide plate on the reflective sheet and including a plurality of light guide patterns on a rear surface of the light guide plate and flat portions located between adjacent ones of the plurality of light guide patterns, each of the plurality of light guide patterns including a protruding portion and a groove portion;
a first light source at one side of the light guide plate; and
an optical sheet on the light guide plate, wherein one of the protruding portion and the groove portion is positioned at a center of the other one of the protruding portion and the groove portion, and the protruding portion protrudes outwardly from the rear surface, wherein, with respect to a front surface of the light guide plate opposite to the rear surface, the rear surface of the flat portion has a height smaller than that of the protruding portion and greater than that of the groove portion, wherein a surface of the groove portion is entirely flat and parallel with the rear surface of the flat portion, and wherein a surface of the protruding portion is entirely flat and parallel with the rear surface of the flat portion and wherein each protruding portion is surrounded by its own individual groove portion and the same groove portion does not surround another protruding portion.

12. The liquid crystal display device according to claim 11, wherein the one of the protruding portion and the groove portion has a cross-sectional view of a circular shape, an elliptical shape or a polygonal shape.

13. The liquid crystal display device according to claim 11, wherein the one of the protruding portion and the groove portion has a width being one-third or half of a width of the other one of the protruding portion and the groove portion.

14. The liquid crystal display device according to claim 11, wherein a density of the light guide patters at the one side of the light guide plate is smaller than a density of the light guide patterns at the other side of the light guide plate.

15. The liquid crystal display device according to claim 11, further comprising a second light source at the other side of the light guide plate.

16. The liquid crystal display device according to claim 15, wherein a density of the light guide patterns at each of the one side and the other side of the light guide plate is smaller than a density of the light guide patterns at a center of the light guide plate.

17. The liquid crystal display device according to claim 11, further comprising:
a bottom frame under the backlight unit;
a main frame surrounding sides of the backlight unit; and
a top frame surrounding an edge of the liquid crystal panel and attached to the bottom frame and the main frame.

* * * * *